US010176148B2

(12) United States Patent
Dhaundiyal

(10) Patent No.: US 10,176,148 B2
(45) Date of Patent: Jan. 8, 2019

(54) SMART FLIP OPERATION FOR GROUPED OBJECTS

(71) Applicant: MICROSOFT TECHNOLOGY LICENSING, LLC, Redmond, WA (US)

(72) Inventor: Rahul Dhaundiyal, Hyderabad (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 468 days.

(21) Appl. No.: 14/837,723

(22) Filed: Aug. 27, 2015

(65) Prior Publication Data
US 2017/0060817 A1 Mar. 2, 2017

(51) Int. Cl.
G06F 17/21 (2006.01)
G06F 17/30 (2006.01)
G06K 9/18 (2006.01)
G06T 3/40 (2006.01)
G06T 3/20 (2006.01)
G06K 9/00 (2006.01)
G06T 7/68 (2017.01)

(52) U.S. Cl.
CPC ...... G06F 17/212 (2013.01); G06F 17/30386 (2013.01); G06K 9/00442 (2013.01); G06K 9/18 (2013.01); G06T 3/20 (2013.01); G06T 3/40 (2013.01); G06T 7/68 (2017.01)

(58) Field of Classification Search
CPC .................................. G06F 17/21; G06F 17/30
See application file for complete search history.

(56) References Cited

U.S. PATENT DOCUMENTS

| 4,962,475 | A | 10/1990 | Hernandez et al. | |
| 5,144,682 | A * | 9/1992 | Nakamura | G06K 9/32 382/177 |
| 6,281,872 | B1 | 8/2001 | Cariffe | |
| 6,327,388 | B1 | 12/2001 | Zhou et al. | |
| 7,587,524 | B2 | 9/2009 | Cho et al. | |
| 7,730,418 | B2 * | 6/2010 | Wang | G06F 9/451 715/800 |
| 8,103,099 | B2 | 1/2012 | Andel et al. | |

(Continued)

FOREIGN PATENT DOCUMENTS

| EP | 0215203 A2 | 3/1987 | |
| WO | WO 2007041647 A2 * | 4/2007 | ....... G06F 17/30247 |
| WO | WO 2016003436 A1 * | 1/2016 | ............ H04M 3/567 |

OTHER PUBLICATIONS

"International Preliminary Report on Patentability Issued in PCT Application No. PCT/US2016/047671", dated Mar. 9, 2017, 9 Pages.

(Continued)

Primary Examiner — Kyle R Stork
Assistant Examiner — Sookil J Lee

(57) ABSTRACT

Technologies are described to provide smart flipping of groups of objects. According to some examples, a graphics module within an application may determine whether an object within a group of objects to be flipped is flippable, that is can be flipped without resulting in loss of object context after the flip operation. Then, the graphics module may flip the group of objects translating all objects (moving their locations to appropriate new locations based on the flip operation), flipping the Objects that can be flipped, and not flipping the object deemed not flippable, thereby preserving the displayed context of the object.

20 Claims, 6 Drawing Sheets

(56) References Cited

U.S. PATENT DOCUMENTS

| | | | | |
|---|---|---|---|---|
| 8,447,144 | B2* | 5/2013 | King | H04N 1/00244 382/305 |
| 8,503,782 | B2 | 8/2013 | Vincent et al. | |
| 8,825,655 | B1 | 9/2014 | Li et al. | |
| 8,885,952 | B1* | 11/2014 | Filip | G06F 17/30247 382/225 |
| 9,619,120 | B1* | 4/2017 | Girard | G06F 3/0484 |
| 2005/0180632 | A1* | 8/2005 | Aradhye | G06K 9/3258 382/182 |
| 2006/0132500 | A1* | 6/2006 | Santoli | G06T 3/60 345/619 |
| 2008/0292215 | A1 | 11/2008 | Gaucas et al. | |
| 2009/0298548 | A1* | 12/2009 | Kim | H04M 1/72544 455/566 |
| 2010/0289627 | A1* | 11/2010 | McAllister | G06Q 10/087 340/10.42 |
| 2010/0306022 | A1* | 12/2010 | Plut | G06Q 30/02 705/14.54 |
| 2011/0013843 | A1* | 1/2011 | Seeber | G06F 17/30256 382/190 |
| 2012/0002880 | A1* | 1/2012 | Lipson | G06F 17/30247 382/195 |
| 2012/0263385 | A1 | 10/2012 | Van Zwol et al. | |
| 2013/0235037 | A1* | 9/2013 | Baldwin | G06F 21/00 345/420 |
| 2013/0262989 | A1* | 10/2013 | Jain | G06F 17/212 715/243 |
| 2013/0278629 | A1* | 10/2013 | Tan | G06F 3/1454 345/629 |
| 2014/0223348 | A1* | 8/2014 | Champagne | G06F 3/0482 715/771 |
| 2014/0226900 | A1 | 8/2014 | Saban et al. | |
| 2015/0085304 | A1* | 3/2015 | Matsudaira | H04N 1/32 358/1.9 |
| 2017/0061639 | A1* | 3/2017 | Georgescu | G06K 9/00228 |

OTHER PUBLICATIONS

"International Search Report and Written Opinion Issued in PCT Application No. PCT/US2016/047671", dated Nov. 11, 2016, 13 Pages.

Le, et al., "Fast Geometric Transformations on Quantum Images", "In the IAENG International Journal of Applied Mathematics", Aug. 1, 2010, 11 Pages.

Walberg, George, "Geometric Transformation Techniques for Digital Images: A Survey" Retrieved from <<http://academiccommons.columbia.edu/download/fedora_content/download/ac:142815/CONTENT/cucs-390-88.pdf>>, Dec. 1, 1988, 96 Pages.

"Automatically Detect and Recognize Text in Natural Images", Published on: Nov. 30, 2014 Available at: http://in.mathworks.com/help/vision/examples/automatically-detect-and-recognize-text-in-natural-images.html.

"Recognize Text Using Optical Character Recognition (OCR)", Published on: Nov. 19, 2014 Available at: http://in.mathworks.com/help/vision/examples/recognize-text-using-optical-character-recognition-ocr.html.

"Sheet Symbol", Retrieved on: Jun. 17, 2015 Available at: http://documentation.circuitmaker.com/display/CMAK/Sch_Obj-SheetSymbol%28%28Sheet+Symbol%29%29_CM.

"Rotate or flip a SmartArt graphic shape", Retrieved on: Jun. 17, 2015 Available at: https://support.office.com/en-us/article/Rotate-or-flip-a-SmartArt-graphic-shape-5b696178-52b7-412b-bfcb-e3b5d8b809ce#bm5.

"Google Goggles", Published on: Oct. 5, 2012 Available at: https://play.google.com/store/apps/details?id=com.google.android.apps.unveil&hl=en.

"Fast, scalable and Accurate Mobile Image Recognition", Retrieved on: Jun. 17, 2015 Available at: https://services.tineye.com/MobileEngine.

* cited by examiner

SMART FLIP OPERATION FOR GROUPED OBJECTS

BACKGROUND

Visual presentation is an important part of a variety of applications ranging from word processing to presentation applications. Such applications include tools to present text, graphics, images, and other objects, and to enable users to manipulate their presentation to fit the user's needs. When creating a presentation or a storyboard, sometimes there may be a need to flip the scene. For example, a scene with a user on left looking at objects to the right may need to be flipped to have the user on right and objects to the left. Same is true when creating workflow diagrams, where information is shown flowing from one direction to another. The traditional method of flipping the scene is to first group all objects in the scene, and then to flip the grouped object. Flipping a group object (a) translates/moves individual objects from one position to another, and (b) flips/mirrors individual objects. However, some objects may contain content that may not be displayed correctly if the object is flipped such as company logos.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

According to some embodiments, a request to perform a flip operation for selected objects within a document may be received. One of the selected objects may be determined to be not flippable, where an object is not flippable if a displayed context of the object is lost after the flip operation. Subsequently, the flip operation may be performed by translating locations of the selected objects around a flip axis, not mirroring the object deemed not to be flippable, and mirroring remaining objects of the selected objects. The selected objects may be displayed with the flip operation performed.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
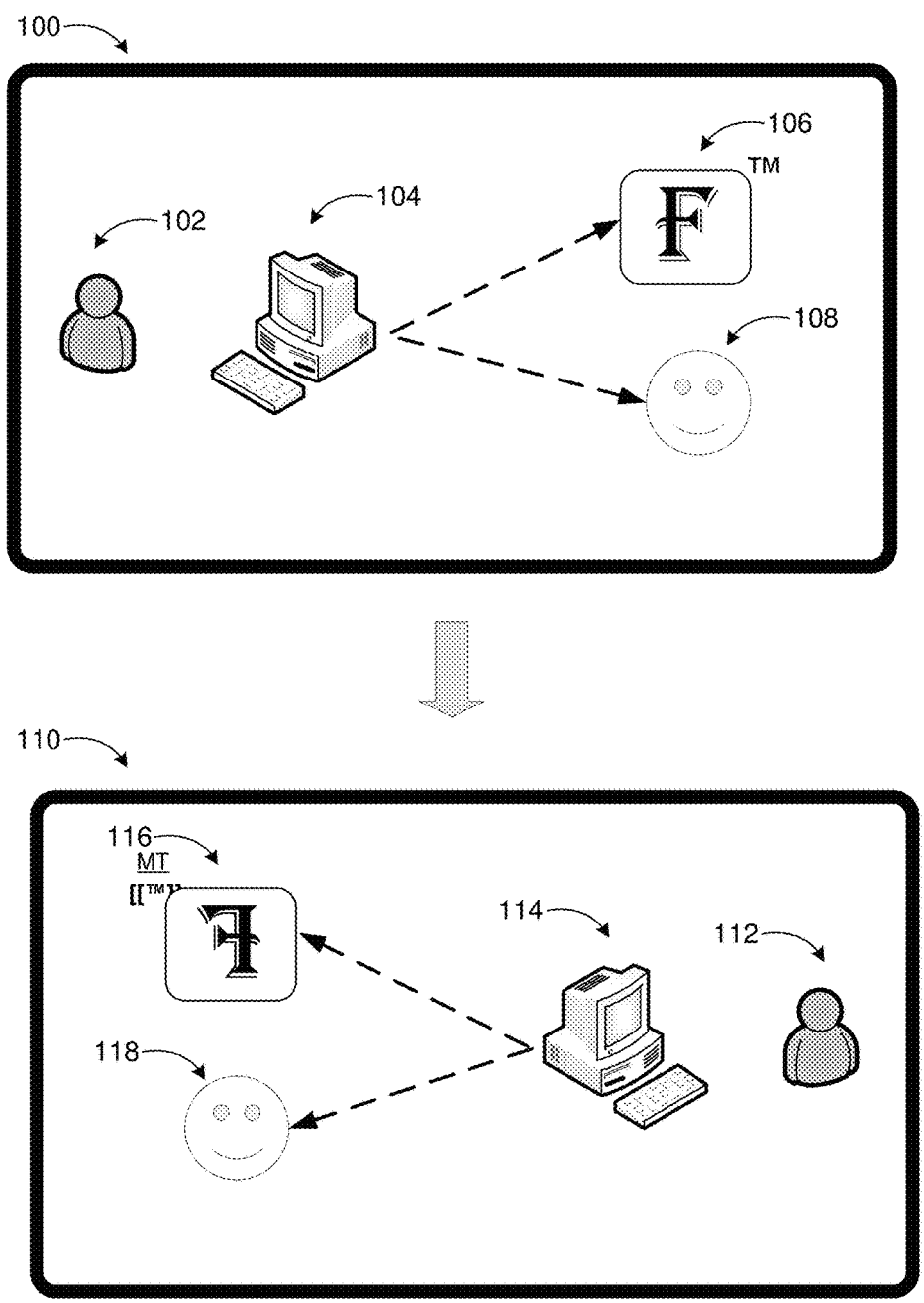
FIG. 1 illustrates an example flip operation of a group of objects, where some objects may not be displayed correctly after the flip operation.

As briefly stated above, a graphics module within an application may determine whether an object within a group of objects to be flipped is flippable, that is can be flipped without resulting in loss of object context after the flip operation. Then, the graphics module may flip the group of objects translating all objects (moving their locations to appropriate new locations based on the flip operation), flipping the objects that can be flipped, and not flipping the object deemed not flippable.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable memory device includes a hardware device that includes a hard disk drive, a solid state drive, a compact disk, and a memory chip, among others. The computer-readable storage medium can for example be implemented via one or more of a volatile computer memory, a non-volatile memory, a hard drive, and a flash drive.

Throughout this specification, the term "platform" may be a combination of software and hardware components to provide an inventory management service. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example embodiments may be found in the following description.

The technical advantages of providing smart flip operations on groups of objects may include increased system efficiency resulting from reduced operations in object flipping. Without the embodiments, a user would have to manipulate not flippable objects manually resulting in added complexity, computational capacity usage, and memory usage. If a hosted application is used, additional network bandwidth usage may also result from added operations. In a system according to embodiments, the additional, possibly manual, operations may be avoided by proper flipping of groups of objects with not flippable objects being preserved.

FIG. 1 illustrates an example flip operation of a group of objects, where some objects may not be displayed correctly after the flip operation.

In FIG. 1, the transition of a displayed scene 100 to a displayed scene 110 as a result of a group flip operation is shown. The displayed scene 100 includes objects 102, 104, 106, and 108. The objects are flipped as a group around a vertical axis (horizontal flip operation), where each object's location is translated around the flip axis and then each object is mirrored resulting in objects 112, 114, 116, and 118.

While the flip operation does not appear to impact a displayed context of the objects 102, 104, and 108, object 106 is a trademarked logo and includes a textual element (stylized letter "F"), which when mirrored loses its displayed context. Thus, object 106 is not flippable. A standard flip operation, however, translates and mirrors all objects in the group. Therefore, the operation does not preserve displayed context of all objects.

The "indiscriminate" flipping of objects within a group may result in trademarked logos, images with textual elements in them, and similar objects to be displayed wrong. Thus, a user may have to perform manual operations to separate the object from the group, translate its location without mirroring the object. The manual operation may not accurately translate the location. Furthermore, breaking of the group relation may result in other unintended consequences. For example, in presentations or web pages, animations or other appearance properties may be associated with individual objects or groups. By having to break the group relationship to preserve the displayed context of an object, a user may also be forced to re-establish any animation/appearance properties.

Figure 2:
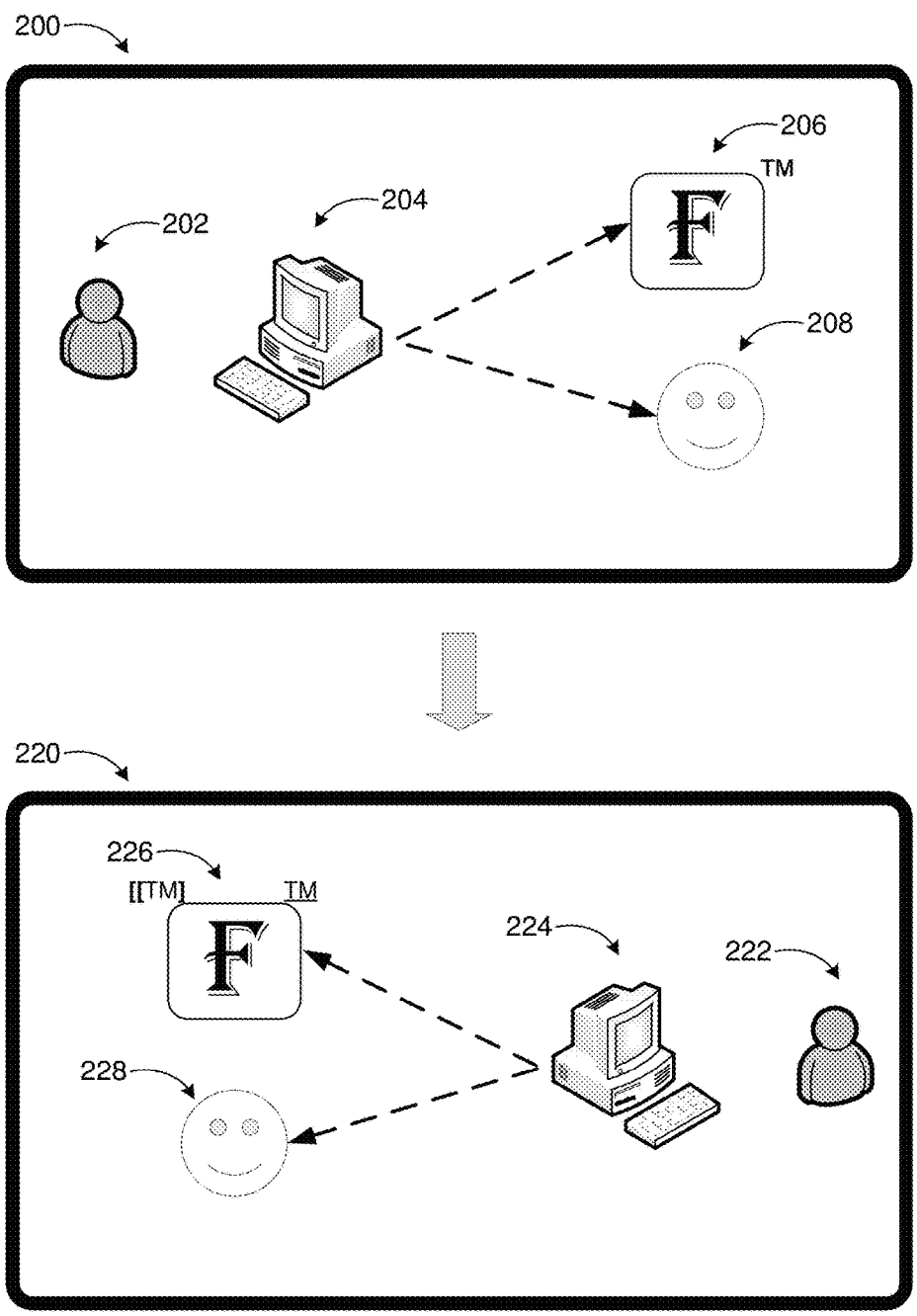
FIG. 2 illustrates an example flip operation of a group of objects according to some embodiments, where some all objects are displayed correctly after the flip operation.

FIG. 2 illustrates an example flip operation of a group of objects according to some embodiments, where some all objects are displayed correctly after the flip operation.

In FIG. 2, the displayed scene 200, which is similar to the displayed scene 100 of FIG. 1 with objects 202, 204, 206, and 208, is subjected to a horizontal flip operation resulting in the displayed scene 210. Objects 202, 204, and 208 are subjected to normal flip operations, where their locations are translated and they are mirrored resulting in the objects 212, 214, and 218. Object 206, however, is detected as a not flippable object (logo with textual element), and is only translated, not mirrored. Thus, in the resulting displayed scene 210, the displayed context of object 216 is preserved. The logo appears, as it should.

Embodiments are not limited to horizontal flip operations. Vertical flip operations (around a horizontal axis) or flip operations around any axis may be performed using the principles described herein. Furthermore, flip operations may be not be limited to translation and mirroring. Additional steps such as adjustment of locations based on a size and shape of the canvas (e.g., shrink, enlarge, shift) may also be included.

Figure 3:
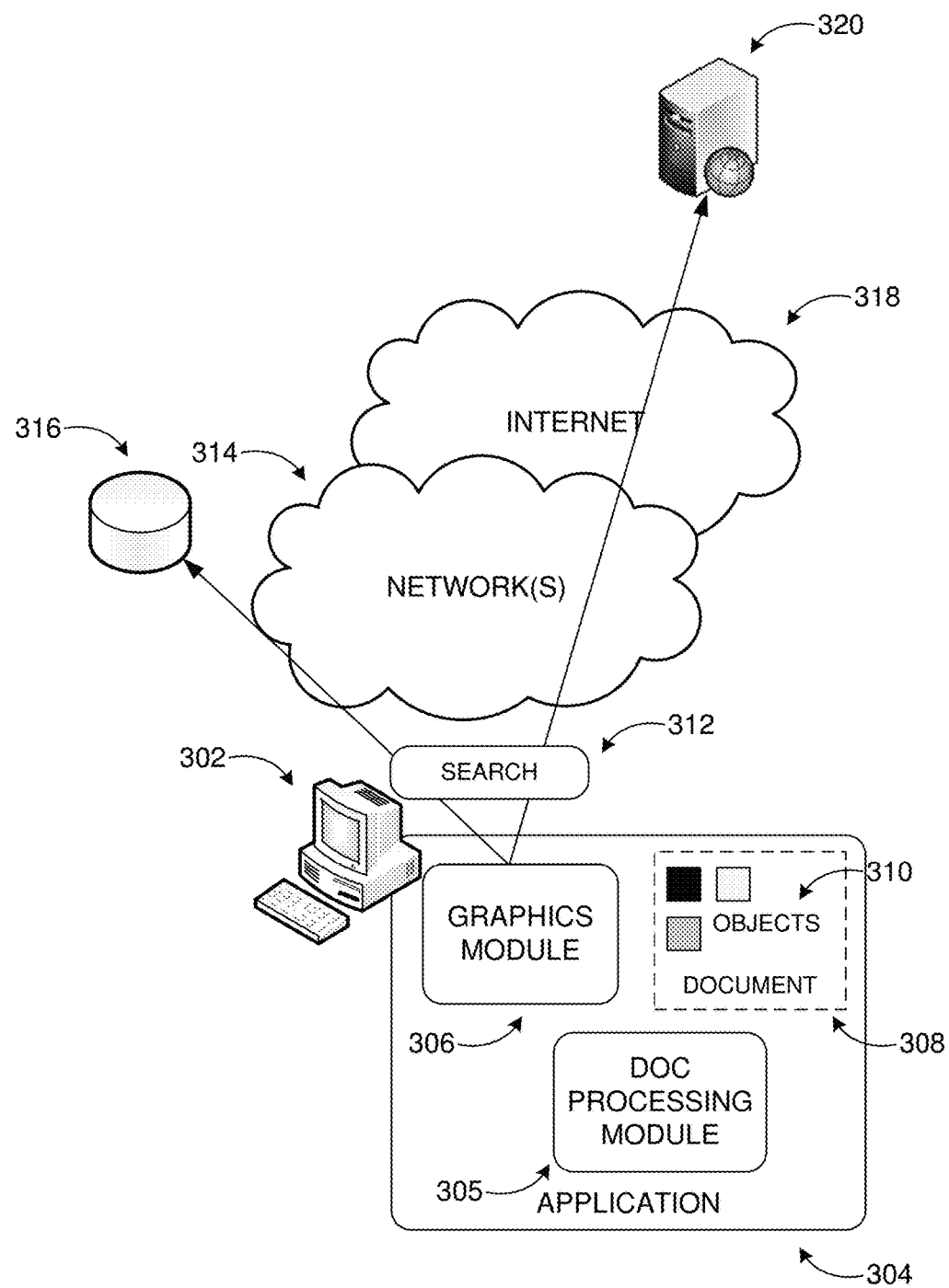
FIG. 3 illustrates an example system to implement smart flip operations on groups of objects.

FIG. 3 illustrates an example system to implement smart flip operations on groups of objects.

Smart flip operations may be performed by any application that displays objects. Such applications may include, but are not limited to, word processing applications, presentation applications, graphics applications, web page design display applications, chart processing applications, spreadsheet applications, and comparable ones. An application providing smart flip operations may be a local application executed on a computing device or a hosted application executed on one or more servers and accessed through a web browser at a client device.

As shown in the example configuration, application 304 may be executed on computing device 302 and include a graphics module 306 and a document processing module 305. The application may process a document 308 through the document processing module 305 with objects 310 in the document 308. Graphics module 306 may perform graphics related actions on the objects 310, which may include flip operations on one or more objects. In response to detecting a flip request, the graphics module may (itself or through mother module associated with the application 304) perform a search 312 for the objects in the group to be flipped. The search may begin with an image recognition or optical character recognition operation on the object(s). This way, any objects that include textual elements may be detected. Then, a local, enterprise level, or Internet search may be performed. For example the object(s) may be compared against Objects stored in a local or enterprise data store 316 that are deemed not flippable. The Internet search may include communications with servers (320) over private (314) or public (318) networks. The comparison may also include objects that are logos, trademarked items, and so on.

The graphics module 306 may perform the flip operations by translating locations of the object around the requested flip axis and mirroring flippable objects, but preserving the appearance of the objects that are deemed to be not flippable as a result of the search. In other embodiments, the user may also be enabled to identify objects that should not be mirrored. The search may further include analysis of metadata of similar images, file names, alternative texts for images, keywords in web pages containing similar images, and comparable approaches. In further embodiments, a confidence threshold may be automatically and/or manually determined for identifying found images as the objects being analyzed. The confidence level may also be adjustable based on computing capacity, user preference, and so on.

Various components of a system according to embodiments such as the graphics module may be executed on a variety of computing devices such as dedicated or shared servers (machines in datacenters), interconnected desktop or laptop computing devices, or even mobile computing devices such as vehicle mount or handheld computing devices.

The example scenarios and schemas in FIG. 1 through 3 are shown with specific components, object types, and configurations. Embodiments are not limited to systems according to these example configurations. Smart flip operations for groups of objects may be implemented in configurations employing fewer or additional components in applications and user interfaces. Furthermore, the example objects, modules, and components shown in FIG. 1 through 3 and their subcomponents may be implemented in a similar manner with other values using the principles described herein.

Figure 4:
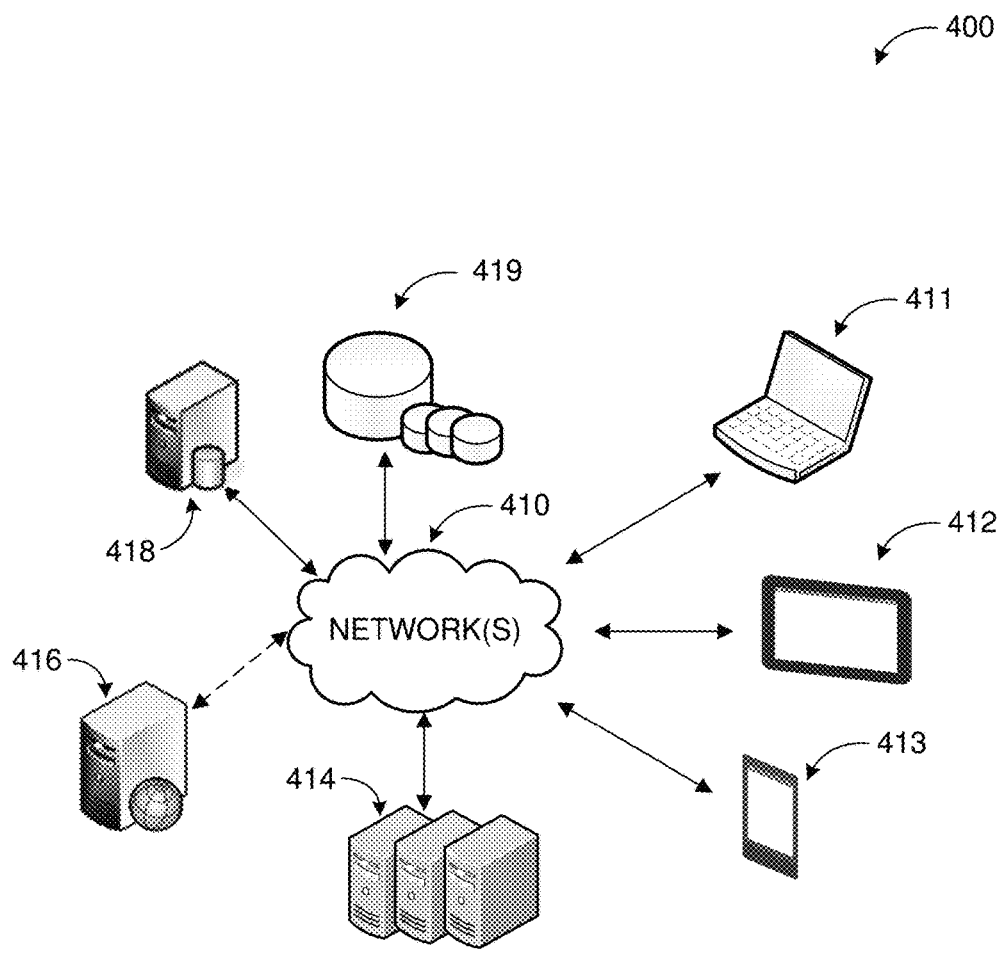
FIG. 4 is an example networked environment, arranged in accordance with at least some embodiments described herein.

FIG. 4 is an example networked environment, where embodiments may be implemented.

As shown in a diagram 400, in a networked environment, a hosted service executed on one or more servers may enable users to work with applications that process, display objects among other things and allow manipulation of objects such as flipping of individual or groups of objects. The service may be a cloud-based service and include one or more applications that may communicate over one or more network(s) 410, such as a cloud.

The hosted service and its components may be implemented via software executed over servers 414 or groups of servers 416. In other examples, the hosted service may include one or more web applications. The hosted service may store data associated with data in a data store 419 directly or through a database server 418.

The network(s) 410 may comprise any topology of servers, clients, Internet service providers, and communication media. A system according to embodiments may have a static or dynamic topology. The network(s) 410 may include multiple secure networks, such as an enterprise network, an unsecure network, or the Internet. The unsecure network may include a wireless open network. The network(s) 410 may also coordinate communication over other networks, such as Public Switched Telephone Network (PSTN) or cellular networks. Furthermore, the network(s) 410 may include multiple short-range wireless networks, such as Bluetooth, or similar ones. The network(s) 410 may provide communication between the nodes described herein. By way of example, and not limitation, the network(s) 410 may include wireless media. The wireless media may include, among others, acoustic media, RF media, infrared media, and other wireless media.

Many other configurations of the computing devices, the applications, the data sources, and the data distribution systems may be employed to provide smart flip operations for groups of objects. Furthermore, the networked environments discussed in FIG. 4 are for illustration purposes only. Embodiments are not limited to the example applications, modules, or processes.

Figure 5:
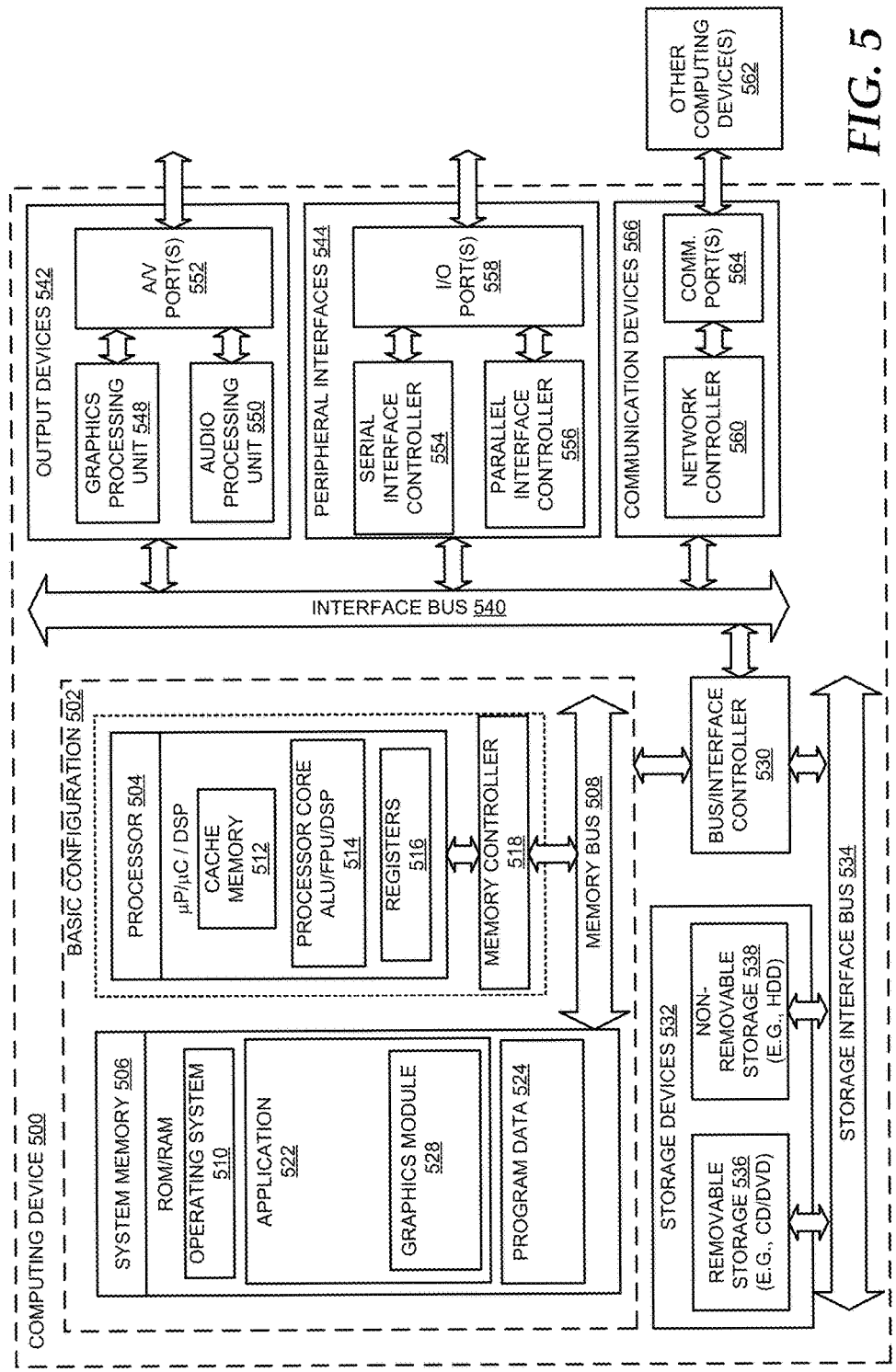
FIG. 5 illustrates a general purpose computing device, which may be configured to provide smart flip operations on groups of objects, arranged in accordance with at least some embodiments described herein.

FIG. 5 illustrates a general purpose computing device, which may be configured to provide smart flip operations on groups of objects, arranged in accordance with at least some embodiments described herein.

For example, a computing device 500 may be a server used to provide an ERP service, as discussed herein in an example of a basic configuration 502, the computing device 500 may include a processor 504 and a system memory 506. The processor 504 may include multiple processors. A memory bus 508 may be used for communication between the processor 504 and the system memory 506. The basic configuration 502 may be illustrated in FIG. 5 by those components within the inner dashed Depending on the desired configuration, the processor 504 may be of any type, including, but not limited to, a microprocessor (µP), a microcontroller (µC), a digital signal processor (DSP), or any combination thereof. The processor 504 may include one more levels of caching, such as a level cache memory 512, a processor core 514, and registers 516. The processor core 514 may include an arithmetic logic unit (ALU), a floating point unit (FPU), a digital signal processing core (DSP Core), or any combination thereof. A memory controller 518 may also be used with the processor 504, or in some implementations, the memory controller 518 may be an internal part of the processor 504.

Depending on the desired configuration, the system memory 506 may be of any type including but not limited to volatile memory (such as RAM), non-volatile memory (such as ROM, flash memory, etc.), or any combination thereof. The system memory 506 may include an operating system 520, an application 522, and program data 524. The application 522 may include a graphics module 528 that performs flip operations as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and data storage devices 532 via a storage interface bus 534. The data storage devices 532 may be removable storage devices 536, non removable storage devices 538, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system 506, the removable storage devices 536, and the non-removable storage devices 538 may be examples of computer storage media. Computer storage media may include, but may not be limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (for example, one or more output devices 542, one or more peripheral interfaces 544, and one or more communication devices 566) to the basic configuration 502 via the bus/interface controller 530. The one or more output devices 542 may include a graphics processing unit 548 and an audio processing unit 550, which may be configured to communicate to various external devices, such as a display or speakers via one or more A/V ports 552. The one or more peripheral interfaces 544 may include a serial interface controller 554 or a parallel interface controller 556, which may be configured to communicate with external devices, such as input devices (for example, keyboard, mouse, pen, voice input device, touch input device, etc.) or other peripheral devices (for example, printer, scanner, etc.) via one or more I/O ports 558. The one or more communication devices 566 may include a network controller 560, which may be arranged to facilitate communications with one or more other computing devices 562 over a network communication link via one or more communication ports 564. The one or more other computing devices 562 may include servers, client equipment, and comparable devices.

The network communication link may be one example of a communication media. Communication media may be embodied by computer-readable instructions, data structures, program modules, or other data in a modulated data signal, such as a carrier wave or other transport mechanism, and may include any information delivery media. A "modulated data signal" may be a signal that has one or more of the modulated data signal characteristics set or changed in such a manner as to encode information in the signal. By way of example, and not communication media may include wired media such as a wired network or direct-wired connection, and wireless media such as acoustic, radio frequency RE), microwave, infrared (IR), and other wireless media. The term computer-readable media, as used herein, may include both storage media and communication media.

The computing device 500 may be implemented as a part of a general purpose or specialized server, mainframe, or similar computer, which includes any of the above functions. The computing device 500 may also be implemented as a personal computer including both laptop computer and non-laptop computer configurations.

Example embodiments may also include methods to provide smart flip operations on groups of objects. These methods may be implemented in any number of ways, including the structures described herein. One such way may be by machine operations, using devices of the type described in the present disclosure. Another optional way may be for one or more of the individual operations of the methods to be performed in conjunction with one or more human operators performing some of the operations while other operations may be performed by machines. These human operators need not be co-located with each other, but each may be with a machine that performs a portion of the program. In other examples, the human interaction may be automated such as by pre-selected criteria that may be machine automated.

Figure 6:
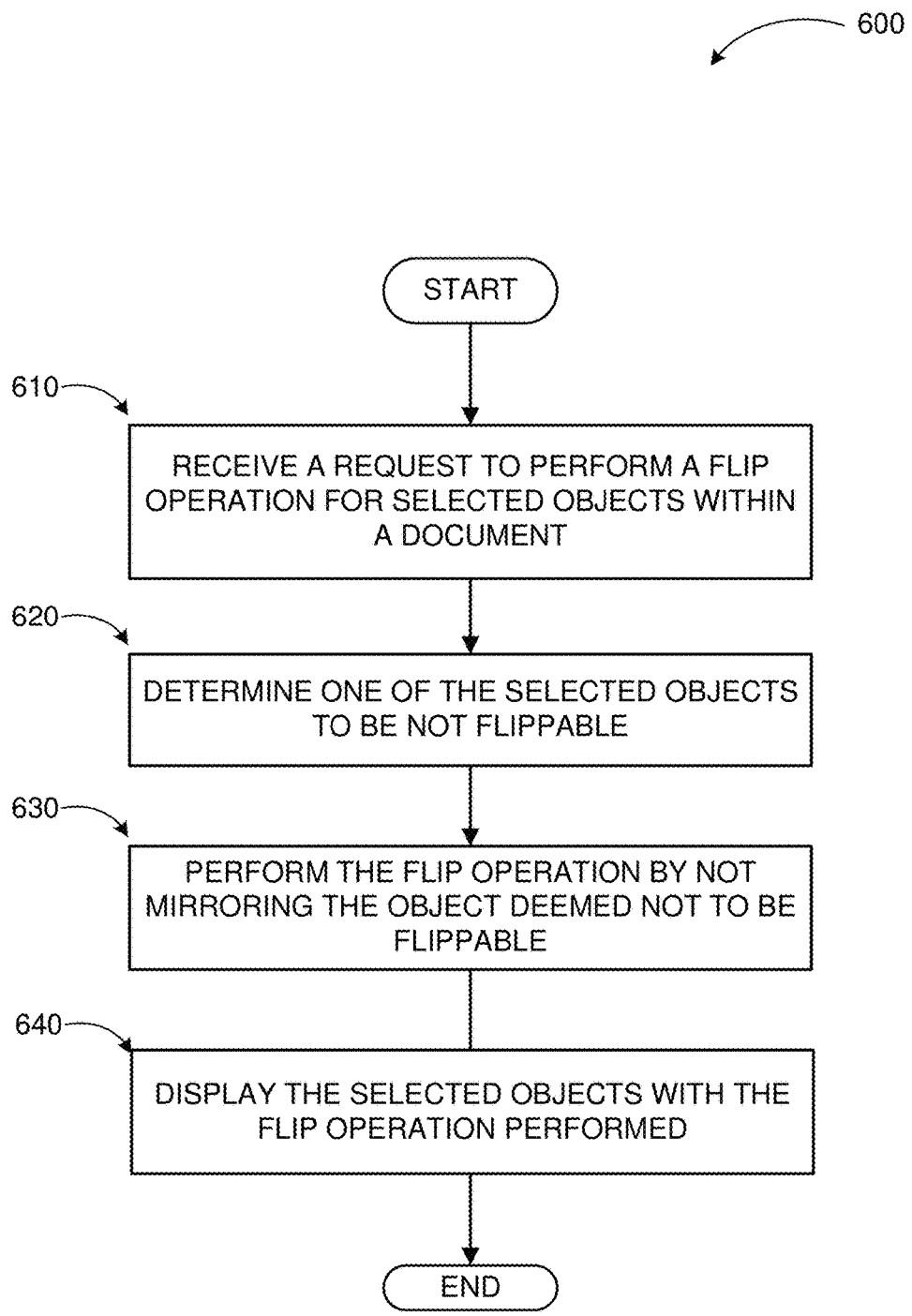
FIG. 6 illustrates a logic flow diagram for an example process to provide smart flip operations on groups of objects, arranged in accordance with at least some embodiments described herein.

FIG. 6 illustrates a logic flow diagram for an example process to provide smart flip operations on groups of objects, arranged in accordance with at least some embodiments described herein.

A process 600 may be implemented by a local application or a hosted service and/or their components, where the components may be executed on one or more servers or other computing devices.

At operation 610, a graphics module within an application processing a document may receive a request to perform a flip operation on selected objects within the document. At operation 620, the graphics module may determine one of the selected objects to be not flippable. An object is not flippable if a displayed context of the object is lost after the flip operation. The graphics module may make the determination through a search for similar objects or images at local or networked resources. The search may also be performed by a search module associated the application.

At operation 630, the graphics module may perform the flip operation on the selected objects. The flip operation may include translating locations of the selected objects around a flip axis, not mirroring the object deemed not to be flippable, and minoring remaining objects of the selected objects. Subsequently, at operation 640, the selected objects may be displayed with the flip operation performed.

The operations included in process 600 are for illustration purposes. An application or hosted service to provide smart flip operations on groups of objects, according to embodiments, may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to examples, a means for providing smart flip operations for grouped objects is described. The means may include a means for receiving a request to perform a flip operation for selected objects within a document being processed by an application; a means for determining one of the selected objects to be not flippable, where an object is not flippable if a displayed context of the object is lost after the flip operation; a means for performing the flip operation by translating locations of the selected objects around a flip axis, a means for not mirroring the object deemed not to be flippable, and a means for mirroring remaining objects of the selected objects; and a means for displaying the selected objects with the flip operation performed.

According to some examples, a computing device to provide smart flip operations for grouped objects is described. The computing device may include a memory and one or more processors coupled to the memory, the one or more processors executing an application in conjunction with instructions stored in the memory. The application may include a document processing module and a graphics module. The document processing module may process a document that includes one or more objects. The graphics module may receive a request to perform a flip operation for selected objects within the document; determine one of the selected objects to be not flippable, where an object is not flippable if a displayed context of the object is lost after the flip operation; perform the flip operation by translating locations of the selected objects around a flip axis, not mirroring the object deemed not to be flippable, and mirroring remaining objects of the selected objects; and display the selected objects with the flip operation performed.

According to other examples, the one of the selected objects may be determined to be not flippable through a search operation. The search operation may include a comparison of the one of the selected objects to images at one or more of a local data store, a networked data store, and the Internet The search operation may further include performing an image recognition or an optical character recognition on the one of the selected objects. The search operation may be performed by a search module associated with the application.

According to further examples, the flip operation may be around a horizontal axis or a vertical axis. The one of the selected objects may be a logo or an image that contains textual elements. The flip operation may further include one or more of a shrink action, an enlargement action, and a shift action on the selected objects. One or more of the shrink action and the enlargement action may preserve proportions of the one of the selected objects. The application may be a local application or a component of a hosted service. The application may be a word processing application, a presentation application, a graphics application, a web page design/display application, a chart processing application, or a spreadsheet application.

According to other examples, a method executed at one or more computing devices to provide smart flip operations for grouped objects is described. The method may include receiving a request to perform a flip operation for selected objects within a document being processed by an application; determining one of the selected objects to be not flippable, where an object is not flippable if a displayed context of the object is lost after the flip operation; performing the flip operation by translating locations of the selected objects around a flip axis, not mirroring the object deemed not to be flippable, and mirroring remaining objects of the selected objects; and displaying the selected objects with the flip operation performed.

According to further examples, determining one of the selected objects to be not flippable may include performing an image recognition or an optical character recognition on the one of the selected objects and comparing the one of the selected objects to images at one or more of a local data store, a networked data store, and the Internet. The method may also include performing an analysis of metadata of one or more of similar images, file names, alternative texts for images, and keywords in web pages containing the similar images.

According to some examples, the method may further include determining a confidence level based on the comparison and determining the one of the selected objects to be not flippable based on a comparison of the confidence level to a predefined confidence threshold. The confidence threshold may be adjustable based on one or more of a computing capacity and a user preference. The method may also include prompting a user to identify the one of the selected objects to be not flippable.

According to further examples, a computer readable memory device with instructions stored thereon to provide smart flip operations for grouped objects is described. The instructions may include receiving a request to perform a flip operation for selected objects within a document being processed by an application; determining one of the selected objects to be not flippable by performing an image recognition or an optical character recognition on the one of the selected objects and comparing the one of the selected objects to images at one or more of a local data store, a networked data store, and the Internet, where an object is not flippable if a displayed context of the object is lost after the flip operation. The instructions may further include performing the flip operation by translating locations of the selected objects around a flip axis, not mirroring the object deemed not to be flippable, and mirroring remaining objects of the selected objects; and displaying the selected objects with the flip operation performed.

According to yet other examples, the instructions may further include determining a confidence level automatically or manually based on the comparison; and determining the one of the selected objects to be not flippable based on a comparison of the confidence level to a predefined confidence threshold, where the confidence threshold is adjustable based on one or more of a computing capacity and a user preference. The flip operation may be around a user selected flip axis.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device to provide smart flip operations for grouped objects, the computing device comprising:
a memory;
one or more processors coupled to the memory, the one or more processors executing an application in conjunction with instructions stored in the memory, wherein the application includes:
a document processing module configured to:
process a document that includes one or more objects; and
a graphics module configured to:
receive a request to perform a flip operation for selected objects within the document;
determine one of the selected objects to be not flippable by determining a confidence level based on a comparison of the one of the selected objects to one or more images and comparing the confidence level to a predefined confidence threshold, wherein the predefined confidence threshold is adjustable based on a computing capacity, and wherein an object is not flippable if a displayed context of the object is lost after the flip operation;
perform the flip operation by translating locations of the selected objects around a flip axis, not mirroring the object deemed not to be flippable, and mirroring remaining objects of the selected objects;
adjust one or more locations of the selected objects based on a size and shape of a canvas of the document, where the one or more locations of the selected objects are adjusted by at least one of a shrink action and an enlargement action; and
display the selected objects with the flip operation performed.

2. The computing device of claim 1, wherein the one of the selected objects is determined to be not flippable through a search operation.

3. The computing device of claim 2, wherein the search operation includes a comparison of the one of the selected objects to images at one or more of a local data store, a networked data store, and the Internet.

4. The computing device of claim 3, wherein the search operation further includes performing one of an image recognition and an optical character recognition on the one of the selected objects.

5. The computing device of claim 3, wherein the search operation is performed by a search module associated with the application.

6. The computing device of claim 1, wherein the flip operation is around one of a horizontal axis and a vertical axis.

7. The computing device of claim 1, wherein the one of the selected objects is one of a logo and an image that contains textual elements.

8. The computing device of claim 1, wherein the flip operation further includes a shift action on the selected objects.

9. The computing device of claim 1, wherein one or more of the shrink action and the enlargement action preserve proportions of the one of the selected objects.

10. The computing device of claim 1, wherein the application is one of a local application and a component of a hosted service.

11. The computing device of claim 1, wherein the application is one of a word processing application, a presentation application, a graphics application, a web page design / display application, a chart processing application, and a spreadsheet application.

12. A method executed at one or more computing devices to provide smart flip operations for grouped objects, the method comprising:
receiving a request to perform a flip operation for selected objects within a document being processed by an application;

determining one of the selected objects to be flippable by determining a confidence level based on a comparison of the one of the selected objects to one or more images and comparing the confidence level to a predefined confidence threshold;

adjusting the predefined confidence threshold based on a computing capacity;

determining one of the selected objects to be not flippable based on the adjusted predefined confidence threshold, wherein an object is not flippable if a displayed context of the object is lost after the flip operation;

performing the flip operation by:
 translating locations of the selected objects around a flip axis,
 not mirroring the object deemed not to be flippable, and mirroring remaining objects of the selected objects;

adjusting one or more locations of the selected objects based on a size and shape of a canvas of the document, where the one or more locations of the selected objects are adjusted by at least one of a shrink action and an enlargement action; and displaying the selected objects with the flip operation performed.

13. The method of claim 12, wherein determining one of the selected objects to be not flippable comprises:
 performing one of an image recognition and an optical character recognition on the one of the selected objects; and
 comparing the one of the selected objects to images at one or more of a local data store, a networked data store, and the Internet.

14. The method of claim 13, further comprising:
 performing an analysis of metadata of one or more of similar images, file names, alternative texts for images, and keywords in web pages containing the similar images.

15. The method of claim 14, further comprising:
 prompting a user to identify the one of the selected objects to be not flippable.

16. The method of claim 12, wherein the confidence threshold is further adjustable based on a user preference.

17. The method of claim 12, wherein the flip operation further includes a shift action on the selected objects.

18. A computer readable memory device with instructions stored thereon to provide smart flip operations for grouped objects, the instructions comprising:
 receiving a request to perform a flip operation for selected objects within a document being processed by an application;
 determining one of the selected objects to be not flippable by:
  performing one of an image recognition and an optical character recognition on the one of the selected objects; and
  determining a confidence level based on comparing the one of the selected objects to images at one or more of a local data store, a networked data store, and the Internet and comparing the confidence level to a predefined confidence threshold, wherein the predefined confidence threshold is adjustable based on a computing capacity, and wherein an object is not flippable if a displayed context of the object is lost after the flip operation;
 performing the flip operation by:
  translating locations of the selected objects around a flip axis,
  not mirroring the object deemed not to be flippable, and mirroring remaining objects of the selected objects;
 adjusting one or more locations of the selected objects based on a size and shape of a canvas of the document, where the one or more locations of the selected objects are adjusted by at least one of a shrink action and an enlargement action; and
 displaying the selected objects with the flip operation performed.

19. The computer readable memory device of claim 18, wherein the confidence threshold is further adjustable based on a user preference.

20. The computer readable memory device of claim 18, wherein the flip operation is around a user selected flip axis.

* * * * *